(12) United States Patent
Sawdon et al.

(10) Patent No.: US 7,263,831 B2
(45) Date of Patent: Sep. 4, 2007

(54) AIR-TO-OIL INTENSIFYING CYLINDER

(75) Inventors: Edwin G. Sawdon, St. Clair, MI (US); Steven J. Sprotberry, Marysville, MI (US)

(73) Assignee: BTM Corporation, Marysville, MI (US)

(*) Notice: Subject to any disclaimer, the term of this patent is extended or adjusted under 35 U.S.C. 154(b) by 9 days.

(21) Appl. No.: 10/953,880

(22) Filed: Sep. 29, 2004

(65) Prior Publication Data

US 2005/0144944 A1 Jul. 7, 2005

Related U.S. Application Data

(63) Continuation-in-part of application No. 10/751,852, filed on Jan. 6, 2004.

(51) Int. Cl.
*B60T 17/22* (2006.01)

(52) U.S. Cl. .......................... 60/591; 60/571

(58) Field of Classification Search ............... 60/547.1, 60/563, 565, 567, 571, 583, 591, 593
See application file for complete search history.

(56) References Cited

U.S. PATENT DOCUMENTS

| | | | |
|---|---|---|---|
| 706,688 A * | 8/1902 | Reynolds et al. ............... 91/443 |
| 2,740,258 A * | 4/1956 | Weber .......................... 60/547.1 |
| 2,827,766 A | 3/1958 | Hufford |
| 2,867,088 A | 1/1959 | Kux |
| 3,426,530 A | 2/1969 | Georgelin |
| 3,633,365 A | 1/1972 | Belknap |
| 4,135,076 A | 1/1979 | Beneteau ....................... 60/583 |
| 4,271,671 A | 6/1981 | Smeets |
| 4,300,351 A | 11/1981 | Grullmeier |
| 4,395,027 A | 7/1983 | Nordmeyer |
| 4,499,728 A | 2/1985 | Therond |
| 4,993,226 A | 2/1991 | De Kok |
| 5,107,681 A | 4/1992 | Wolfbauer, III |
| 5,218,821 A | 6/1993 | Beneteau |
| 5,247,871 A | 9/1993 | Brasca et al. |
| 5,265,423 A | 11/1993 | Glaser |
| 5,429,036 A | 7/1995 | Latos |
| 5,526,644 A | 6/1996 | Brieschke |
| 5,582,009 A | 12/1996 | Brieschke |
| 5,649,424 A | 7/1997 | Valavaara |
| 5,865,029 A | 2/1999 | Brieschke |
| 5,943,862 A | 8/1999 | Malina ......................... 60/563 |
| 6,735,944 B2 | 5/2004 | Sawdon |
| 6,779,343 B2 | 8/2004 | Sawdon |

OTHER PUBLICATIONS

Tox Pressotechnik product brochure, 12 pages, publication date unknown, but believed to be prior to Jan. 6, 2004.
Multicyl product brochure, 8 pages, dated Jul. 1998.

(Continued)

*Primary Examiner*—F. Daniel Lopez
(74) *Attorney, Agent, or Firm*—Harness, Dickey & Pierce, P.L.C.

(57) ABSTRACT

A pressure intensifier for generating a relatively large force includes a plurality of pistons driven in advancing and retracting directions. The pressure intensifier includes a rod selectively drivable into a cavity to amplify the force acting on one of the pistons. A valve limits fluid flow to control the rate of movement of one of the pistons.

18 Claims, 15 Drawing Sheets

OTHER PUBLICATIONS

Aries Engineering Company Inc. product brochure, 5 pages, publication date unknown, but believed to be prior to Jan. 6, 2004.
Farger & Joosten product brochure, 4 pages, dated Sep. 1999.
Farger & Joosten product brochure, 2 pages, dated Mar. 1999.
Alfamatic product information from website, 2 pages, publication date unknown, but believed to be prior to Jan. 6, 2004.
G.P.A. Italiana S.p.A. product information from website, 2 pages, publication date unknown, but believed to be prior to Jan. 6, 2004.
Attexor Inc. product brochure, 2 pages, publication date unknown, but believed to be prior to Jan. 6, 2004.
OHMA Piercing Cylinder Product Guide, Version 3.0, 36 pages, dated 2003.

* cited by examiner

SECTION A-A

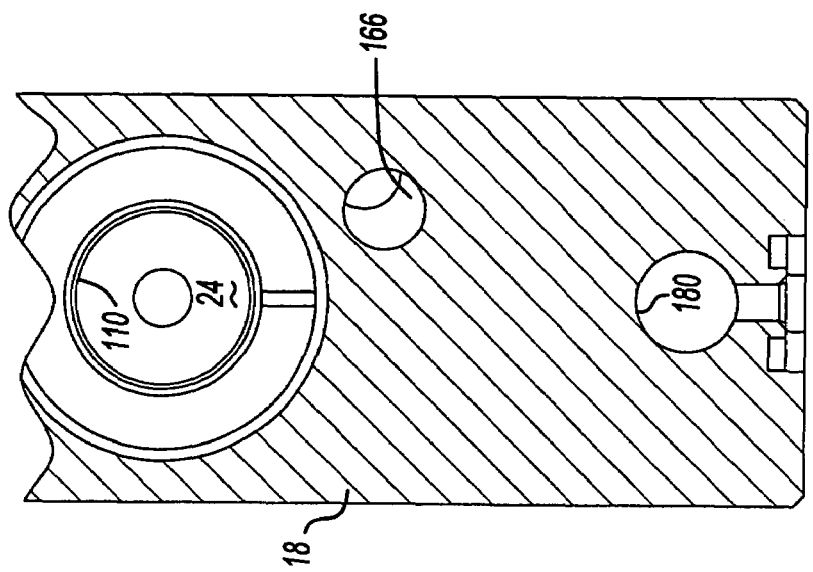
*Fig-10* SECTION F-F
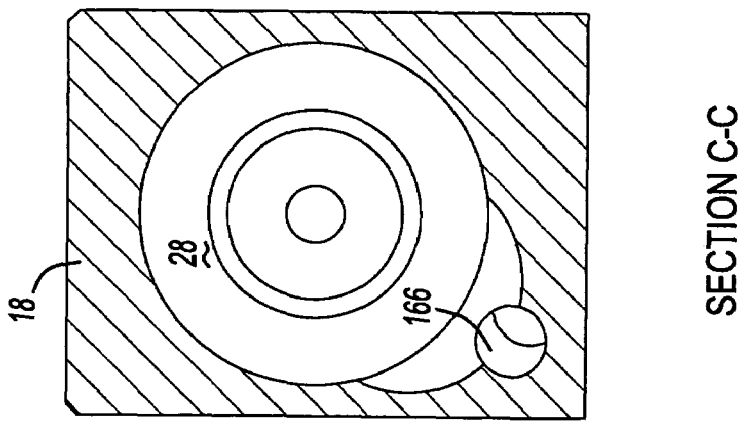
*Fig-9* SECTION C-C
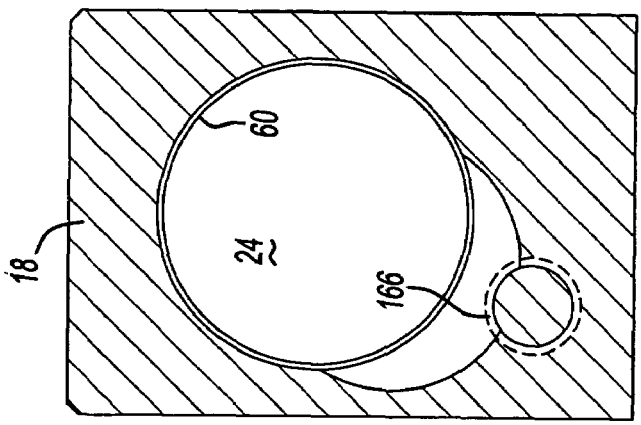
*Fig-8* SECTION B-B

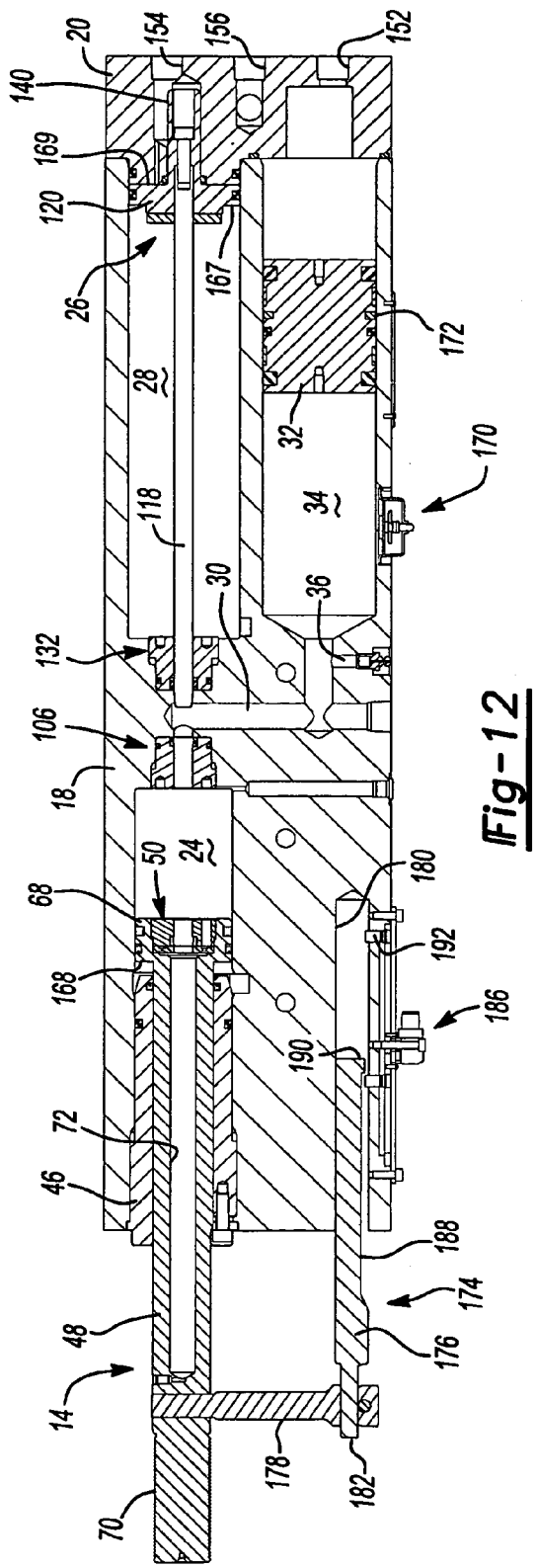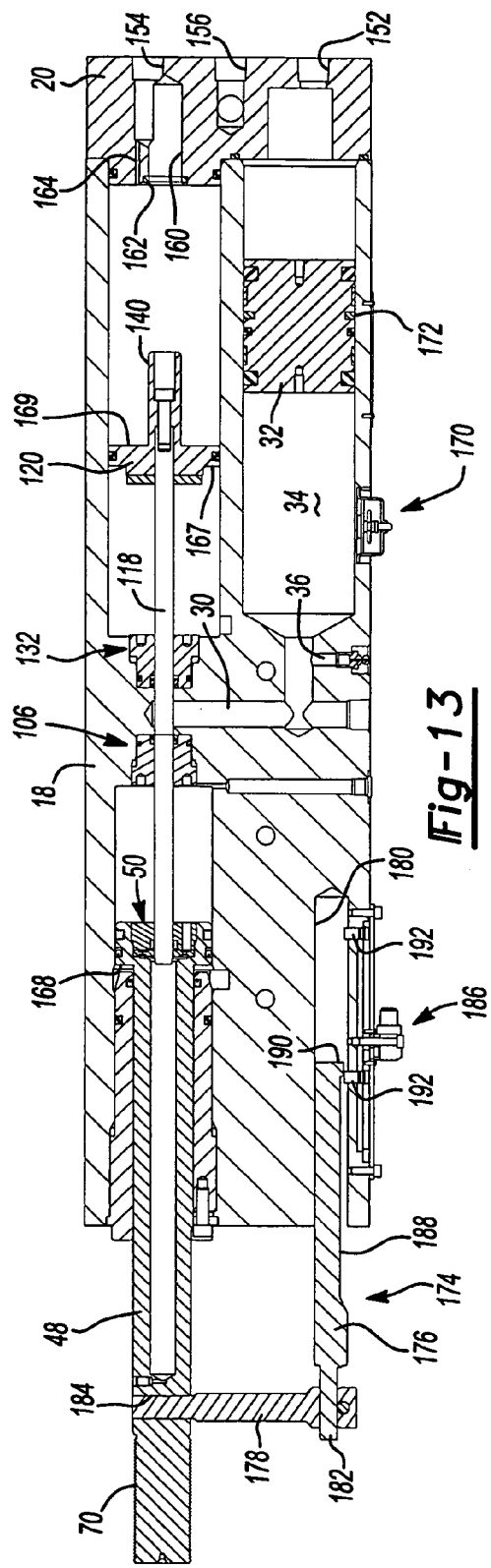

AIR-TO-OIL INTENSIFYING CYLINDER

CROSS-REFERENCE TO RELATED APPLICATIONS

This application is a continuation-in-part of U.S. patent application Ser. No. 10/751,852 filed on Jan. 6, 2004. The disclosure of the above application is incorporated herein by reference.

BACKGROUND AND SUMMARY OF THE INVENTION

The present invention relates generally to a force producing apparatus and, more particularly, to an air-to-oil pressure intensifier for providing relatively large forces to machines such as clamps, grippers, presses and punches.

Many systems utilize the basic principle of inserting a rod into an enclosed oil-filled chamber to produce force. Several of the oil systems use multiple steel cylinder sections interconnected with threaded tie rods and nuts. An oil reservoir is either contained internally within one of the steel cylinder sections or mounted externally. The external reservoir is piped to the intensifying cylinder. Difficulties may arise when attempting to package the cylindrically shaped assemblies as well as provide space and structure to mount the external oil reservoirs. To provide various stroke lengths and power strokes, many slightly different components must be constructed and maintained in an inventory.

Accordingly, it would be beneficial to provide a compact air-to-oil intensifier having a one-piece rectangular body. It would also be beneficial to provide a device eliminating the need for an external oil reservoir.

The present invention provides a pressure intensifier for providing relatively large output forces using an air over hydraulic force amplification system. According to one aspect of the present invention, a rod is driven into a sealed chamber of substantially incompressible fluid to generate an output force.

According to another aspect of the present invention, a compact, lightweight pressure intensifier is provided.

According to another aspect of the present invention, a bore is machined into the body and is utilized as an internal fluid reservoir.

Yet another aspect of the present invention relates to a body having internal porting to minimize the need for external fluid lines.

Another aspect of the present invention includes a dampening mechanism to limit the accelerations of pressure intensified components relative to one another.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 8 is a cross-sectional end view of the body taken along line B-B as shown in FIG. 4;

FIG. 9 is a cross-sectional end view of the body of the pressure intensifier of the present invention taken along line C-C of FIG. 4;

FIG. 10 is a cross-sectional end view of the body of the pressure intensifier taken along line F-F as shown in FIG. 4;

FIGS. 11-14 are cross-sectional side views of the pressure intensifier of the present invention depicting the position of various components at different stages during operation;

DETAILED DESCRIPTION OF THE PREFERRED EMBODIMENTS

Figure 1:
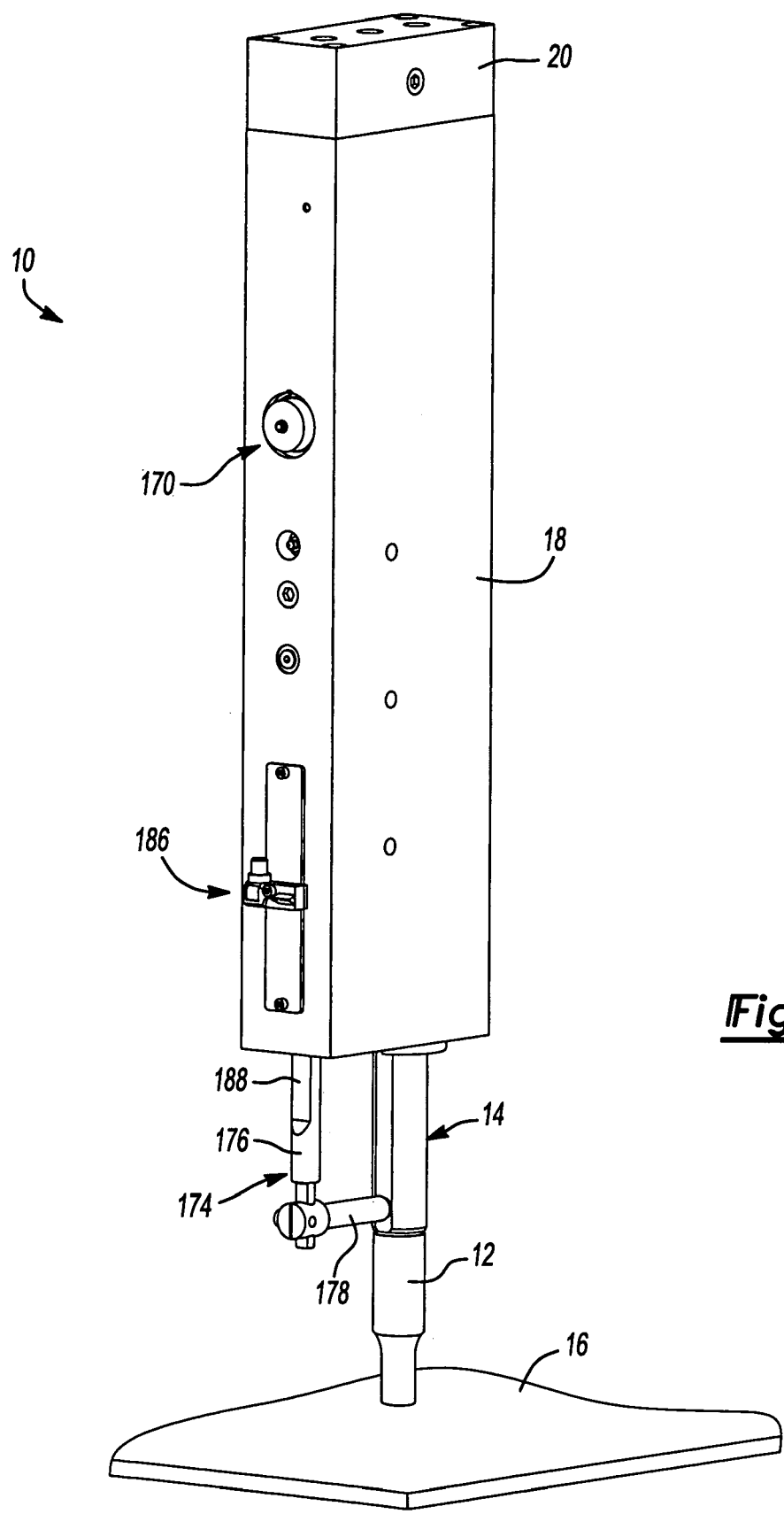
FIG. 1 is a perspective view of a pressure intensifier according to the principles of the present invention.
Figure 2:
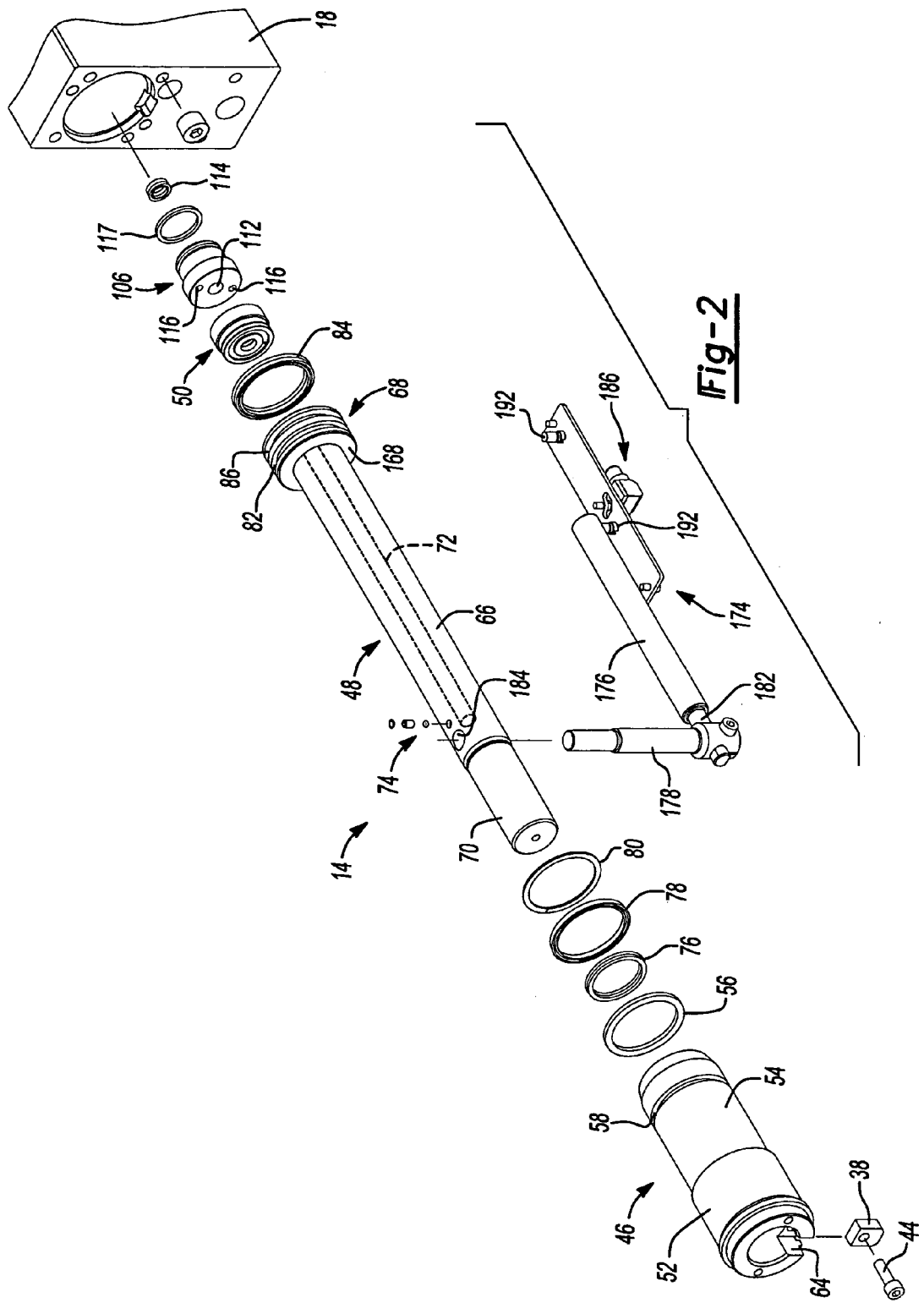
FIG. 2 is a partial exploded perspective view of the pressure intensifier shown in FIG. 1.
Figure 3:
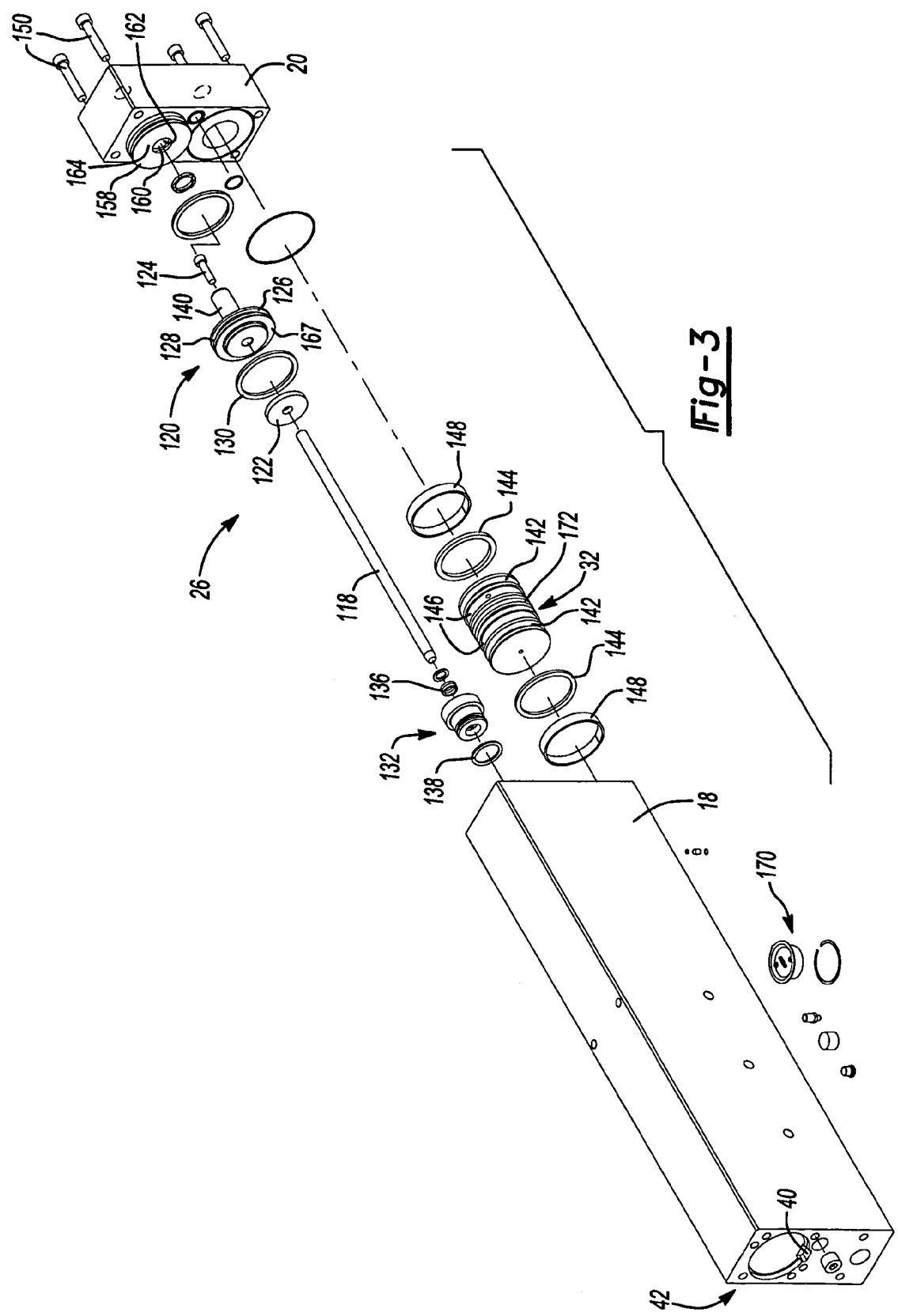
FIG. 3 is another partial exploded perspective view of the pressure intensifier shown in FIG. 1.

With reference to FIGS. 1-3, an air-to-oil pressure intensifier constructed in accordance with the teachings of the present invention is identified at reference numeral 10. Pressure intensifier 10 functions to provide a relatively large output force at a driven end using only compressed air at relatively low pressure (80 to 100 psi) as the power source. Typically, the driven end of the pressure intensifier is coupled to tooling such as a clamp half, a rivet hammer or a punch, collectively identified as a tool 12.

Pressure intensifier 10 operates by advancing and retracting a ram assembly 14 to place tool 12 into engagement with a work piece 16. As will be described in greater detail hereinafter, pressure intensifier 10 operates to rapidly translate tool 12 toward work piece 16 using relatively low force. Once tool 12 contacts work piece 16, pressure intensifier 10 generates a greatly multiplied force between tool 12 and work piece 16. On the return stroke, pistons with relatively large working areas within pressure intensifier 10 are pressurized to retract the ram in preparation for the next work cycle.

As shown in FIGS. 1-4, pressure intensifier 10 includes a substantially rectangular one-piece body 18 coupled to an end cap 20. Ram assembly 14 is positioned within a first cavity 24 of body 18. An intensifier assembly 26 is positioned within a second cavity 28 of body 18. First cavity 24 and second cavity 28 are interconnected by a first passageway 30. An oil piston 32 is positioned within a third cavity 34 of body 18. Third cavity 34 is plumbed in fluid communication with passageway 30. An oil filling port 36 extends from an outer surface of body 18 and terminates at third cavity 34 to allow a user to add fluid to the reservoir defined by third cavity 34 without disassembling pressure intensifier 10.

Ram assembly 14 is positioned within first cavity 24 and is free to axially move therein. A key 38 is positioned within a slot 40 formed at a first end 42 of body 18. A fastener 44 couples key 38 to body 18. Key 38 engages ram assembly 14 and functions to prevent rotation of ram assembly 14 relative to body 18.

Figure 5:
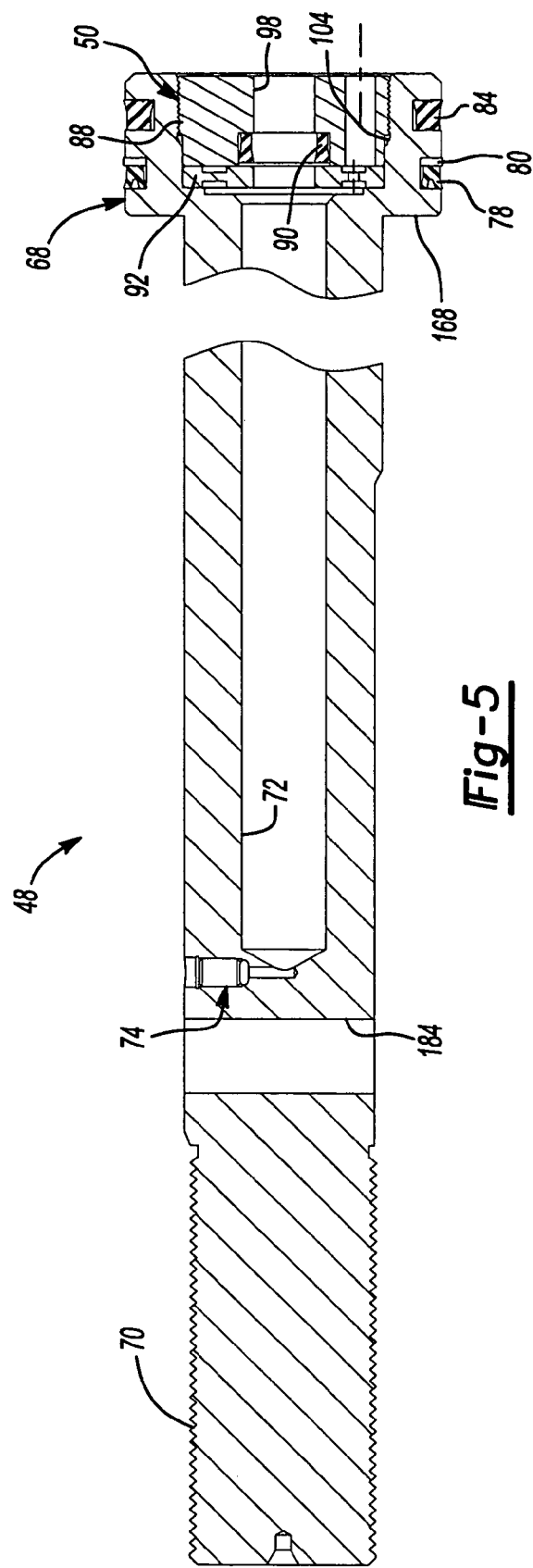
FIG. 5 is a partial, fragmentary cross-sectional side view of a ram of the pressure intensifier.

With reference to FIGS. 2 and 5, ram assembly 14 includes a ram guide 46, a ram 48 and an anti-shock assembly 50. Ram guide 46 is a substantially cylindrical hollow member preferably constructed from bronze. Ram guide 46 includes an externally threaded first section 52 and a second section 54 having a reduced outer diameter. A seal 56 is positioned within a groove 58 formed in second section 54. Seal 56 engages a smooth bore portion 60 of first cavity 24. First cavity 24 includes an enlarged threaded portion 62 proximate to first end 42 of body 18. Externally threaded section 52 of ram guide 46 is coupled to body 18 at threaded portion 62. Ram guide 46 includes a slot 64 aligned with key 38 and slot 40 of body 18.

Ram 48 is an elongated member having a substantially cylindrical body 66 and an enlarged head 68. Body 66 includes a threaded nose portion 70 positioned at an end opposite head 68. A pocket 72 extends axially through head 68 and into body 66. A bleeder assembly 74 is positioned in fluid communication with pocket 72. Bleeder assembly 74 is operable to allow air which may have been inadvertently trapped within pocket 72 to escape to atmosphere. An inner diameter seal 76 is positioned within a groove of ram guide 46 to sealingly engage body 66 of ram 48.

Ram 48 functions as a piston slidable positioned within first cavity 24. To form a sealing piston, a seal 78 and back up ring 80 are positioned within a forward groove 82 of head 68. A high pressure seal 84 is positioned within a rearward groove 86 positioned on head 68.

Figure 6:
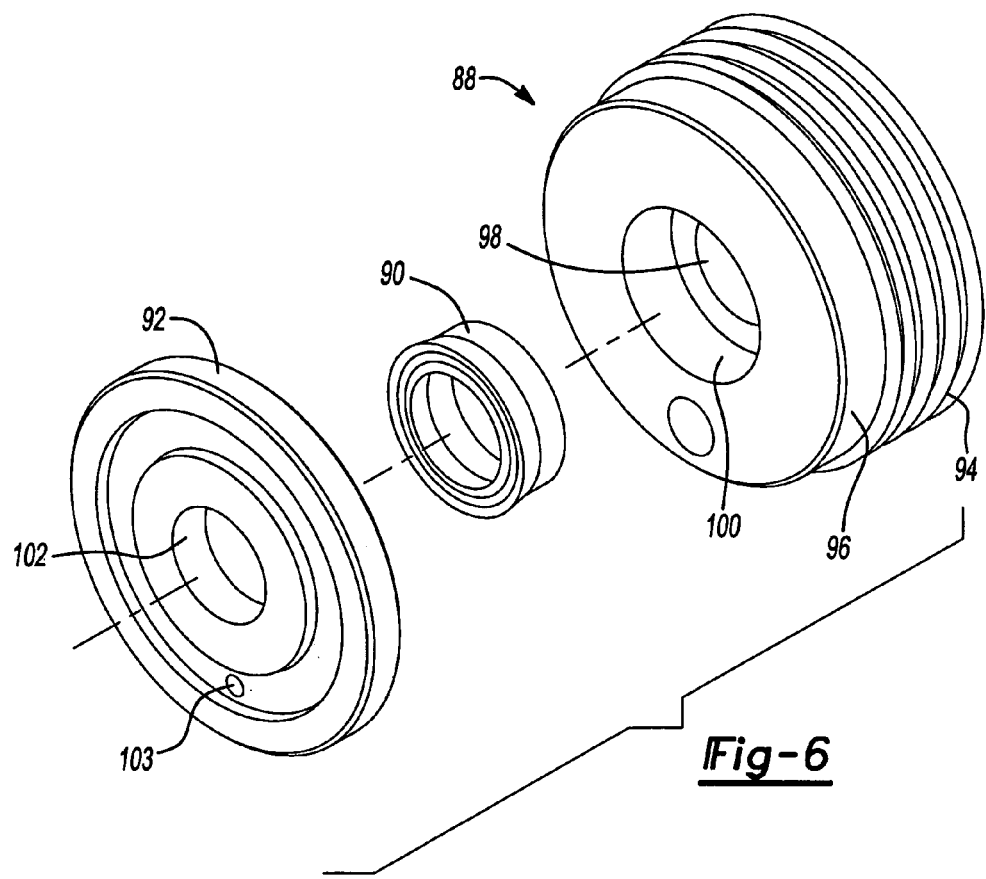
FIG. 6 is an exploded perspective view of an anti-shock assembly constructed in accordance with the teachings of the present invention.
Figure 7:
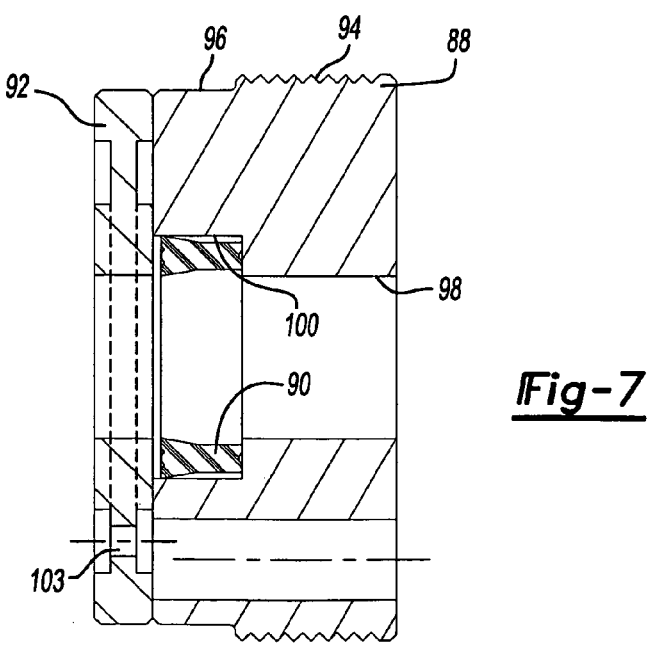
FIG. 7 is a cross-sectional side view of the anti-shock assembly.

As shown in FIGS. 5, 6 and 7, anti-shock assembly 50 includes a seal retainer 88, a seal 90 and a washer 92. Seal retainer 88 is a substantially cylindrical member having a threaded outer portion 94 and an adjacent pilot portion 96 having a diameter less than threaded portion 94. A bore 98 extends through seal retainer 88. Seal 90 is seated within a counter bore 100 coaxially positioned with bore 98.

Washer 92 is a substantially disk shaped member having a first aperture 102 axially aligned with bore 98 of seal retainer 88. A second aperture 103 extends substantially parallel to first aperture 102. Second aperture 103 functions as an orifice for dampening undesirable shock produced during piercing type operations as will be described in greater detail hereinafter.

Anti-shock assembly 50 is threadingly engaged with a threaded portion of a counter bore 104 formed in the head end of ram 48. Seal 90 and washer 92 are trapped within an unthreaded portion of counter bore 104 adjacent the threaded portion.

As shown in FIGS. 8-11, a seal retainer 106 is threadingly fitted within a stepped recess 110 formed at the rearward end of first cavity 24. A counter bore 112 extends through seal retainer 106. A seal 114 is positioned within counter bore 112 and captured within recess 110 upon installation of seal retainer 106. Preferably, seal 114 and seal retainer 106 are assembled separately and coupled to body 18 as one unit. Seal retainer 106 includes a pair of blind bores 116 for receipt of a tool (not shown) for installing the seal retainer and seal assembly to body 18 without the use of snap rings and snap ring pliers. A seal 117 seals the outer diameter of seal retainer 106 and body 18.

Intensifier assembly 26 includes an intensify rod 118 coupled to an intensify piston 120 and a damping washer 122. A fastener 124 couples intensify rod 118 and damping washer 122 to intensify piston 120.

Intensify piston 120 includes a body 126 having an annular groove 128. A seal 130 is positioned within groove 128 and sealingly engages the wall of second cavity 28. A second seal retainer 132 is substantially identical to seal retainer 106. Second seal retainer 132 is threadingly coupled to body 18 within a stepped recess 134 positioned at a forwardmost end of second cavity 28. A seal 136 is positioned within a counter bore of second seal retainer 132. A seal 138 is positioned within an external groove formed on second seal retainer 132 and engages body 18. Intensify piston 120 includes a cylindrically shaped protrusion 140 which cooperates with end cap 20 to reduce impact of the intensify piston with the end cap during the return stroke as will be described in greater detail hereinafter.

Intensify piston 120 is slidably positioned within second cavity 28. Intensify rod 118 extends from second cavity 28 through passageway 30 into first cavity 24. During operation, intensify rod 118 selectively enters pocket 72 of ram 48.

Oil piston 32 is a substantially cylindrical member having a first pair of external annular grooves 142 for receipt of a pair of seals 144. A second pair of annular grooves 146 are formed at each of end of oil piston 32. Bearing sleeves 148 are coupled to oil piston 32 at second grooves 146. Bearing sleeves 148 are preferably constructed from a bearing material such as a RULON® (a reinforced PTFE compound) to ensure that oil piston 32 slides within third cavity 34.

End cap 20 is coupled to body 18 via threaded fasteners 150. End cap 20 includes a first port 152, a second port 154 and a third port 156. First port 152 is in fluid communication with third cavity 34. Second port 154 extends through end cap 20 and is in fluid communication with second cavity 28. A boss 158 of end cap 20 extends into second cavity 28. A first passageway 160 extends through boss 158 in communication with second port 154. First passageway 160 is sized for receipt of protrusion 140 of intensify piston 120. A seal 162 is positioned within first passageway 160 to selectively engage protrusion 140 during a retracting motion of intensifier assembly 26. An orifice 164 is also formed in boss 158. Orifice 164 provides a parallel path for fluid to escape second cavity 28 during retraction of intensifier assembly 26. Impact of intensify piston 120 on boss 158 is alleviated because protrusion 140 engages seal 162 to block first passageway 160. At this time, air trapped between end cap 20 and intensify piston 120 is forced to travel through orifice 164 in order to escape. The restricted flow retards the rate of retraction of intensify piston 120.

Figure 4:
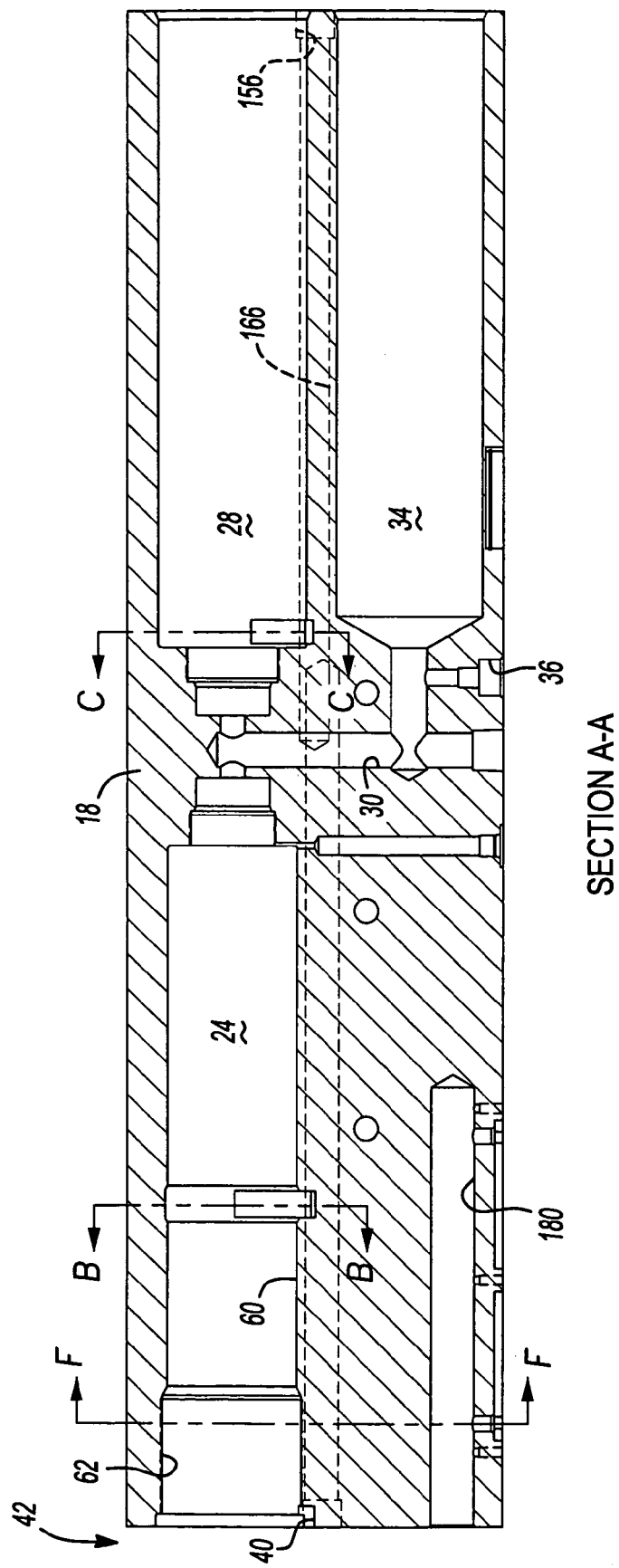
FIG. 4 is a cross-sectional side view of a body of the pressure intensifier of the present invention.

With reference to FIG. 4, body 18 includes a return passageway 166 in fluid communication with third port 156. Return passageway 166 provides a path for pressurized air to act on a forward face 167 of intensify piston 120 and a forward face 168 of ram 48. Specifically, return passageway 166 communicates with first cavity 24 as depicted in FIG. 8. Furthermore, return passageway 166 communicates with second cavity 28 as shown in FIG. 9.

Figure 11:
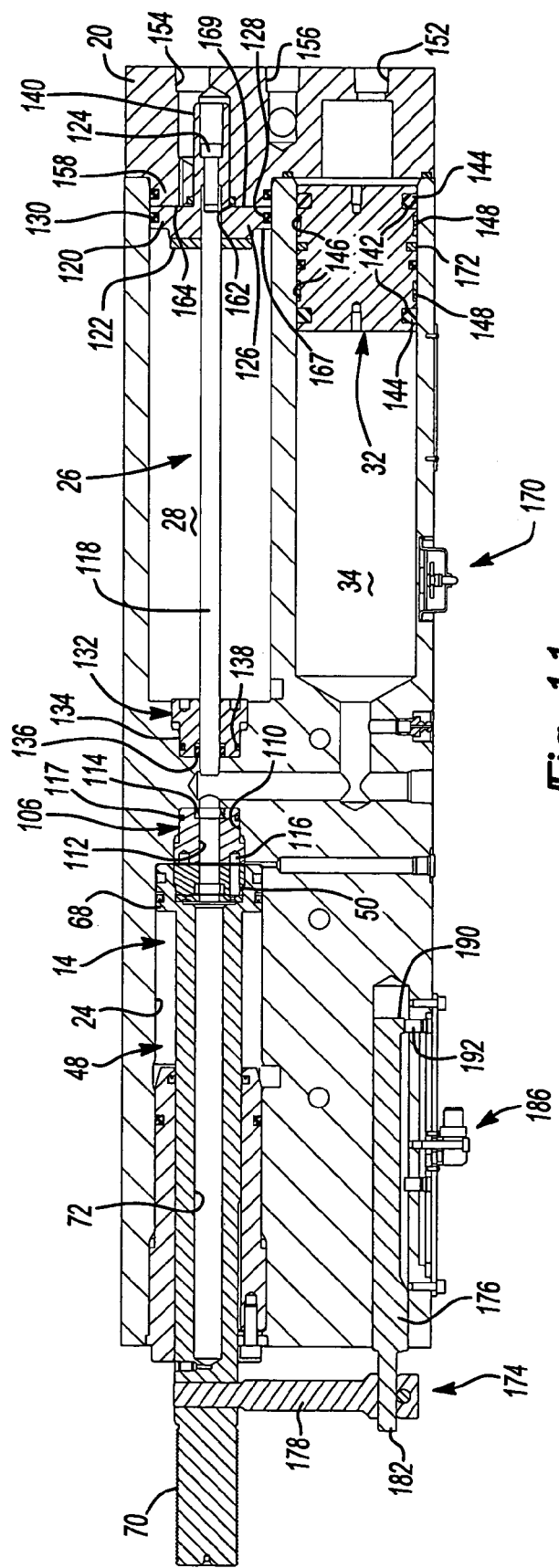

With reference to FIGS. 11-14, operation of pressure intensifier 10 will now be described. FIG. 11 depicts ram assembly 14, intensifier assembly 26 and oil piston 32 in their fully retracted positions. At this time, it should be appreciated that intensify rod 118 is sealingly engaged with inner diameter seal 136 of second seal retainer 132 but is spaced apart from the seal of seal retainer 106. Accordingly, fluid may flow from third cavity 34 into first cavity 24 and pocket 72.

To initiate movement of ram assembly 14 in an advanced direction, pressurized air is supplied to first port 152 while second port 154 and third port 156 are opened to atmosphere. Pressurized fluid acts on oil piston 32 causing it to advance from right to left as shown in FIG. 12. A substantially incompressible fluid is positioned within a portion of third cavity 34 and a portion of first cavity 24 between oil piston 32 and head 68 of ram 48. The pressurized incompressible fluid acts on ram 48 causing the ram to advance. During the first phase of actuation, ram 48 is extended rapidly using relatively low force to cause tool 12 to contact workpiece 16.

Once ram 48 contacts the workpiece, pressure continues to build within third cavity 34. Once a predetermined pressure is met, first port 152 is closed and pressurized air is supplied to second port 154. Pressurized air acts on a rearward face 169 of intensify piston 120 causing intensifier assembly 26 to advance as depicted in FIG. 13. During advancement, intensify rod 118 engages the inner diameter seal of seal retainer 106. Pressure intensification begins at this time because the incompressible fluid is trapped within first cavity 24 and pocket 72. Pressure intensification continues to occur while intensify rod 118 enters anti-shock assembly 50 at FIGS. 13 and 14.

Anti-shock assembly 50 functions to minimize undesirable acceleration of ram 48 which may occur at the end of certain processes such as stamping or punching. For example, during a punching operation, resistance to pressure applied by ram 48 is great during the initial stages of material deformation. However, it is common for the last two-thirds of the thickness of material to rapidly break away offering little to no resistance to the force from ram 48. During this last portion of the punching operation, ram 48 has a tendency to accelerate relative to intensify rod 118 possibly causing internal cavitation of hydraulic fluid, premature cylinder wear and/or premature seal wear. To limit these possibly negative effects, anti-shock assembly 50 sealingly engages intensify rod 118 to define a first trapped volume in pocket 72 and a second trapped volume in the rearmost portion of first cavity 24. Intensify rod 118 may enter pocket 72 but only at the rate defined by the orifice extending through anti-shock assembly 50. Similarly, the speed at which intensify rod 118 may exit pocket 72 is limited by the flow rate of incompressible fluid through the orifice of anti-shock assembly 50.

Figure 14:
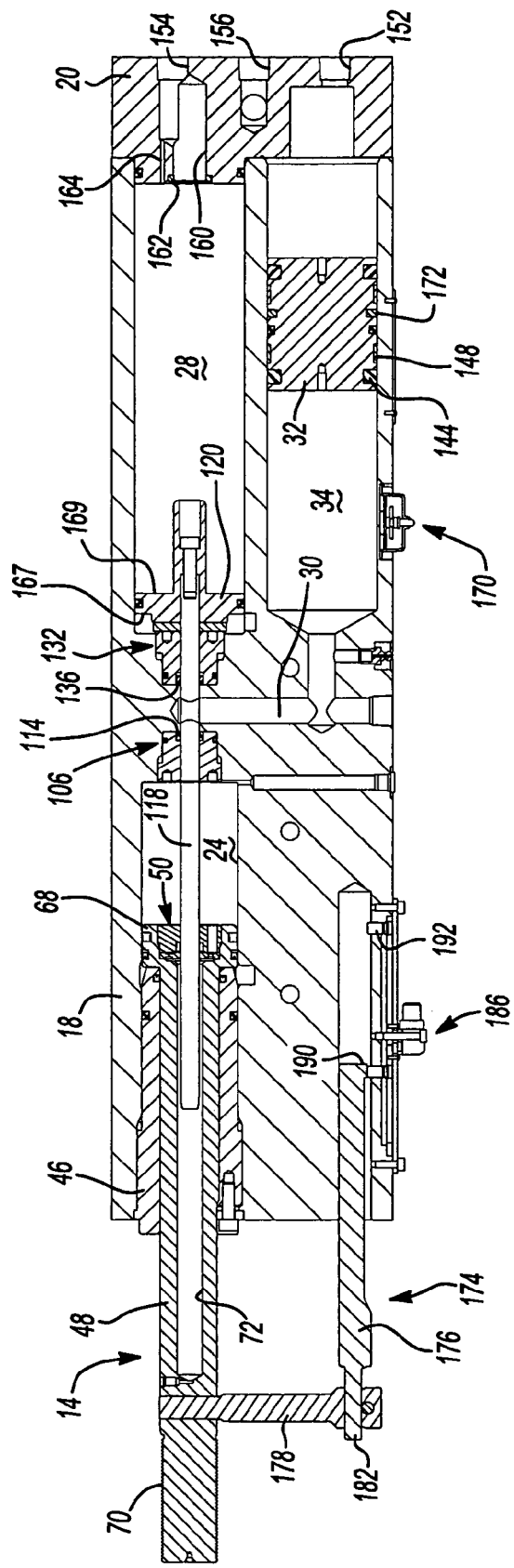
Figure 15:
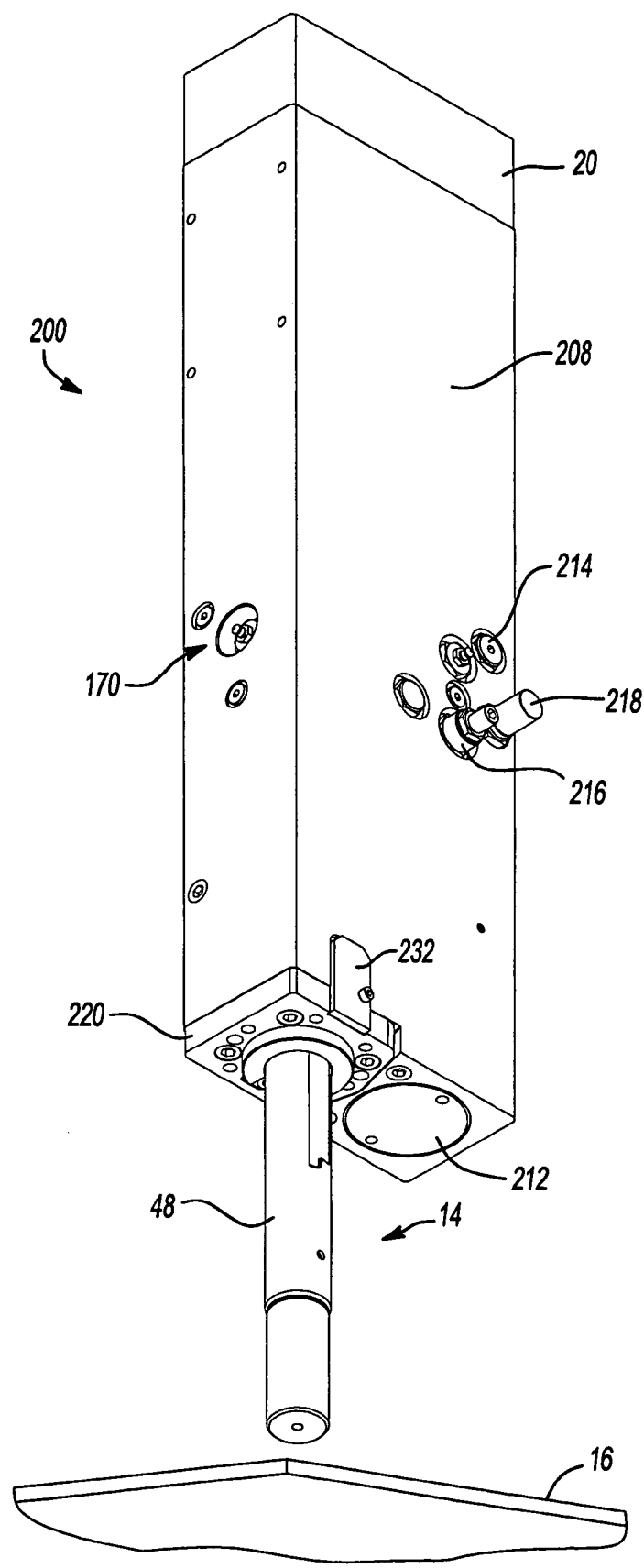
FIG. 15 is a perspective view of an alternate embodiment pressure intensifier.
Figure 16:
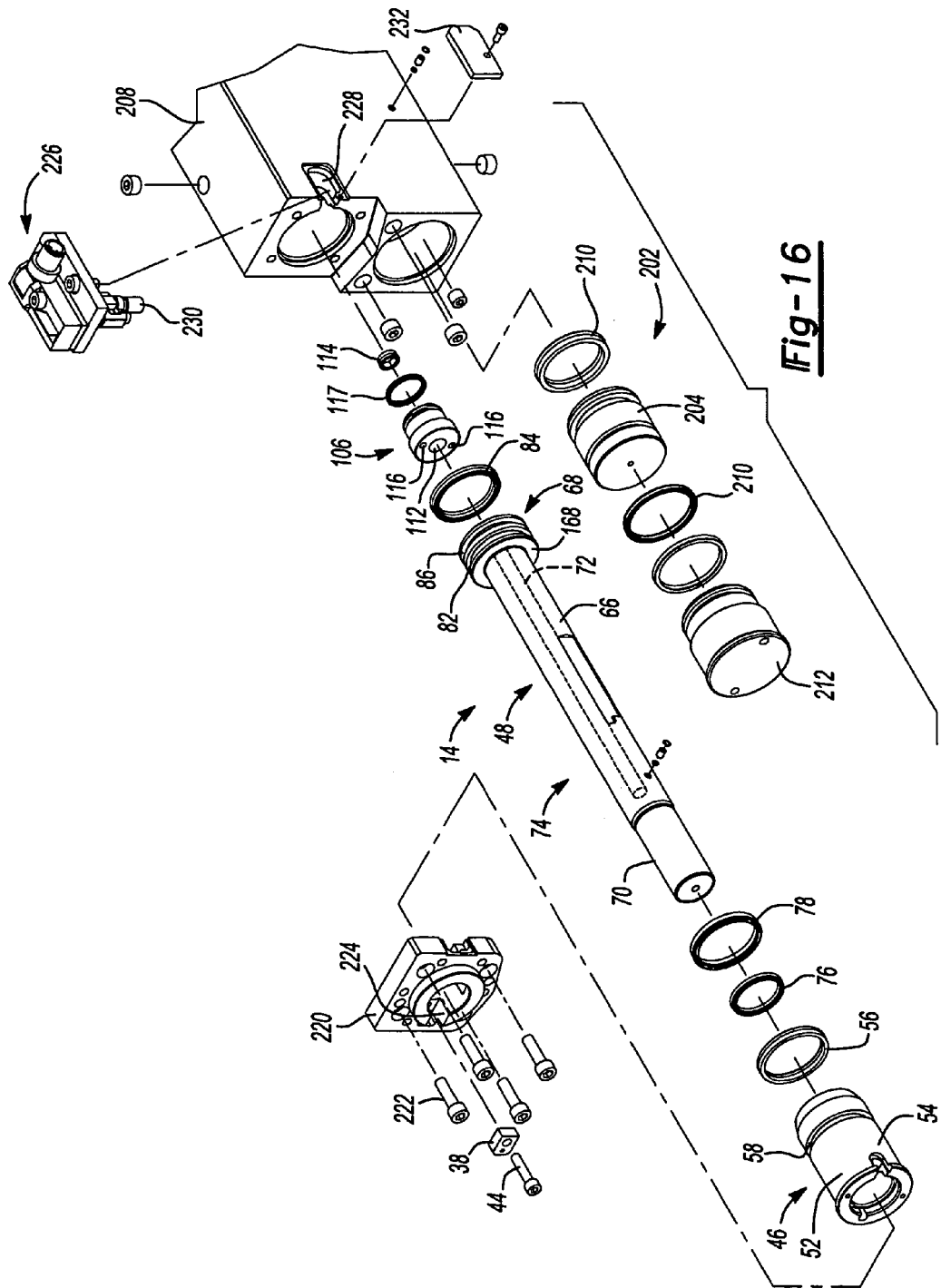
FIG. 16 is a partial exploded perspective view of the pressure intensifier depicted in FIG. 15.
Figure 17:
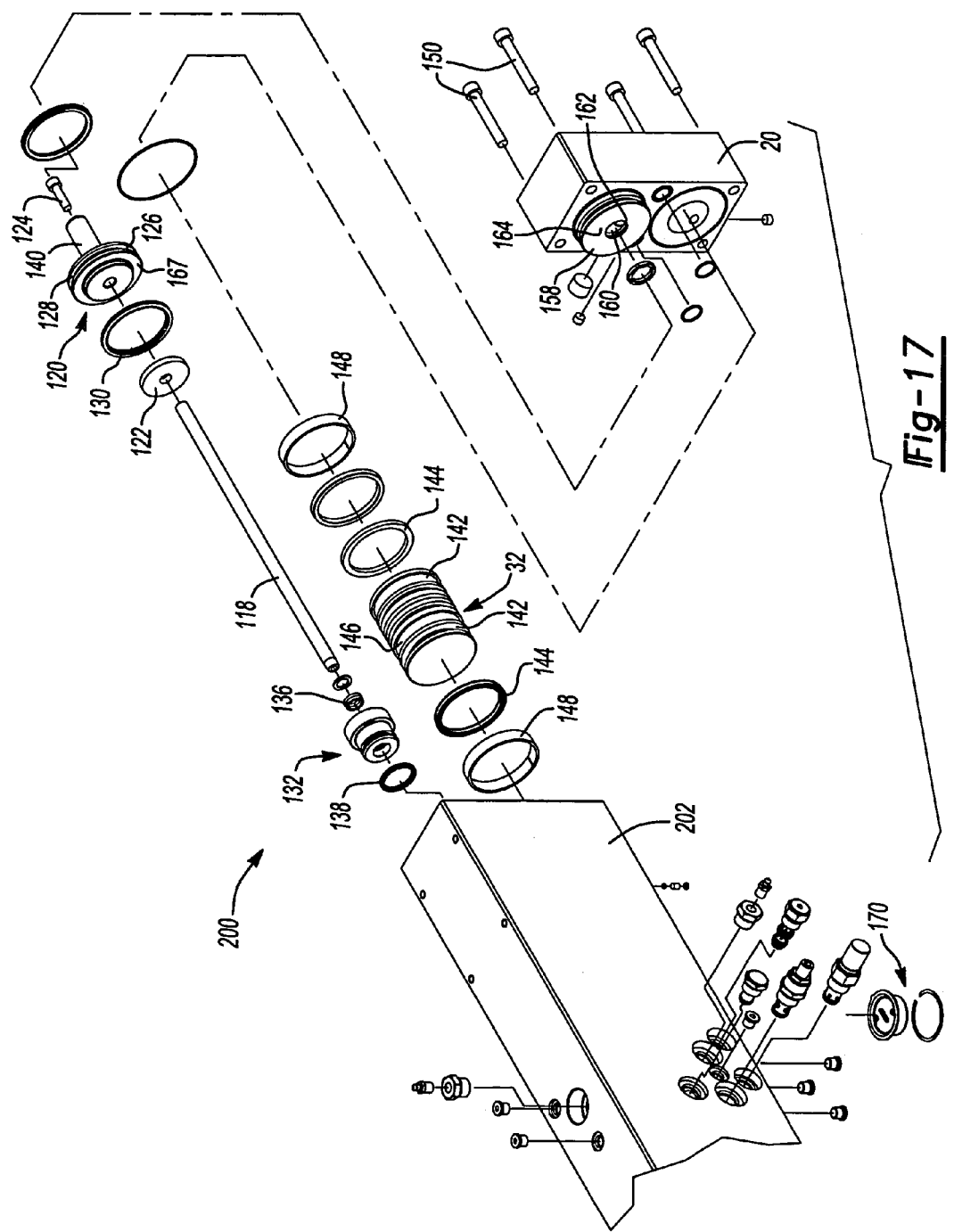
FIG. 17 is another partial exploded perspective view of the pressure intensifier shown in FIG. 15.
Figure 18:
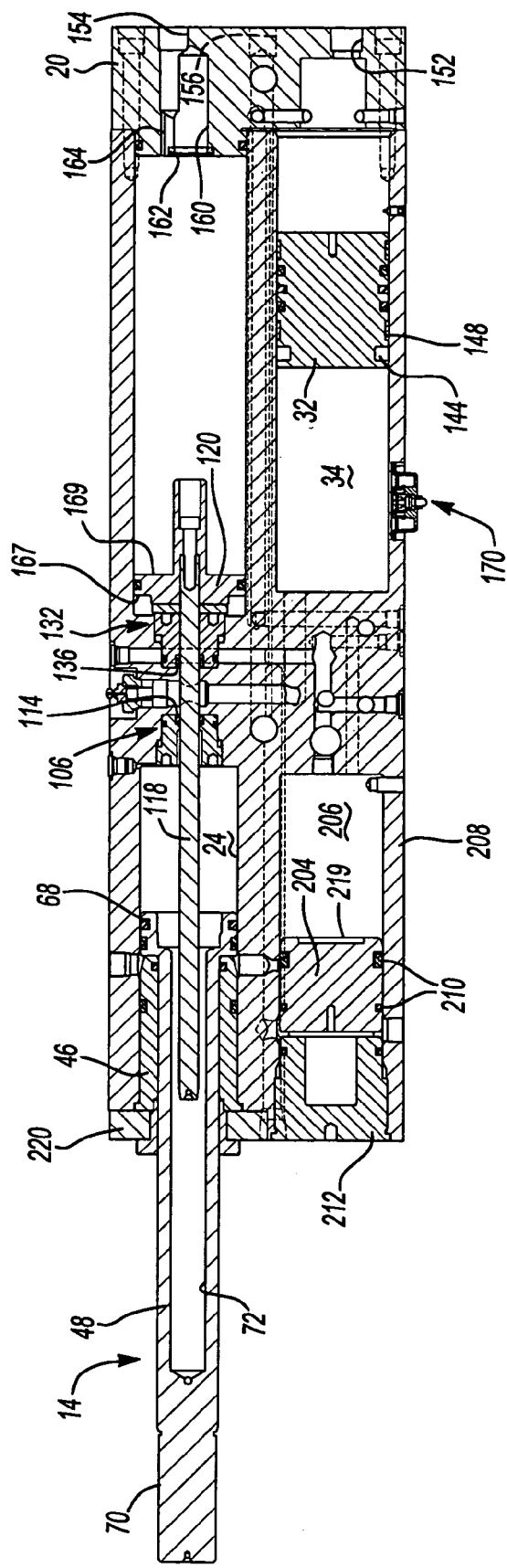
FIG. 18 is a cross-sectional side view of the alternate embodiment pressure intensifier.

FIG. 14 depicts ram 48 and intensifier assembly 26 at their fully advanced positions where the work has been completed. Pressurized air is supplied to third port 156 while first port 152 and second port 154 are exhausted. As mentioned earlier, supply of pressurized air to port 3 travels through return passageway 166 to act on forward face 167 of intensify piston 120 and forward face 168 of ram 48. Hydraulic fluid is transferred from first cavity 24 to third cavity 34 once intensify rod 118 clears seal retainer 106. At this time, each of ram assembly 14, intensifier assembly 26 and oil piston 32 will be returned to their fully retracted positions shown in FIG. 11.

An oil level indicator 170 is positioned near a forward end of third cavity 34. Oil level indicator 170 functions to signal an operator that it is time to add fluid to the reservoir. A magnet 172 is coupled to oil piston 32. As oil is depleted from the system during use, oil piston 32 is allowed to advance further within third cavity 34. When oil piston 32 advances to a position where magnet 172 is proximate oil level indicator 170, a lamp is illuminated to signal the operator. In one embodiment, the lamp pulsates on and off to attract the operator's attention.

An optional proximity sensing assembly 174 includes a longitudinal rod 176 and a transverse rod 178. Longitudinal rod 176 is slidably positioned within a bore 180 (FIG. 10) extending substantially parallel to first cavity 24. One end of transverse rod 178 is coupled to a necked-down portion 182 of longitudinal rod 176. An opposite end of transverse rod 178 is positioned within an aperture 184 transversely extending through ram 48. As ram 48 axially translates, transverse rod 178 and longitudinal rod 176 also translate. Proximity switch 186 is coupled to body 18 to bore 180. Longitudinal rod 176 includes a relieved portion 188 axially extending along a substantial portion of longitudinal rod 176. Relieved portion 188 effectively defines a step 190 at the free end of longitudinal rod 176. As step 190 is positioned proximate one of sensor heads 192, a signal is generated. The position of transverse rod 178 may be adjusted relative to longitudinal rod 176 to allow a user to correlate the position of ram 48 to the signal produced by proximity switch 186.

An alternate embodiment including pressure intensifier 200 is depicted in FIGS. 15-19. Pressure intensifier 200 is substantially similar to pressure intensifier 10. Accordingly, like elements will retain their previously introduced reference numerals. Pressure intensifier 200 includes a dampening system 202 in lieu of anti-shock assembly 50. Dampening system 202 includes a dampening piston 204 slidably positioned with a cavity 206 formed within a housing 208. A pair of seals 210 sealingly engage housing 208 and dampening piston 204. A cap 212 threadingly engages housing 208 to close one end of cavity 206.

Figure 19:
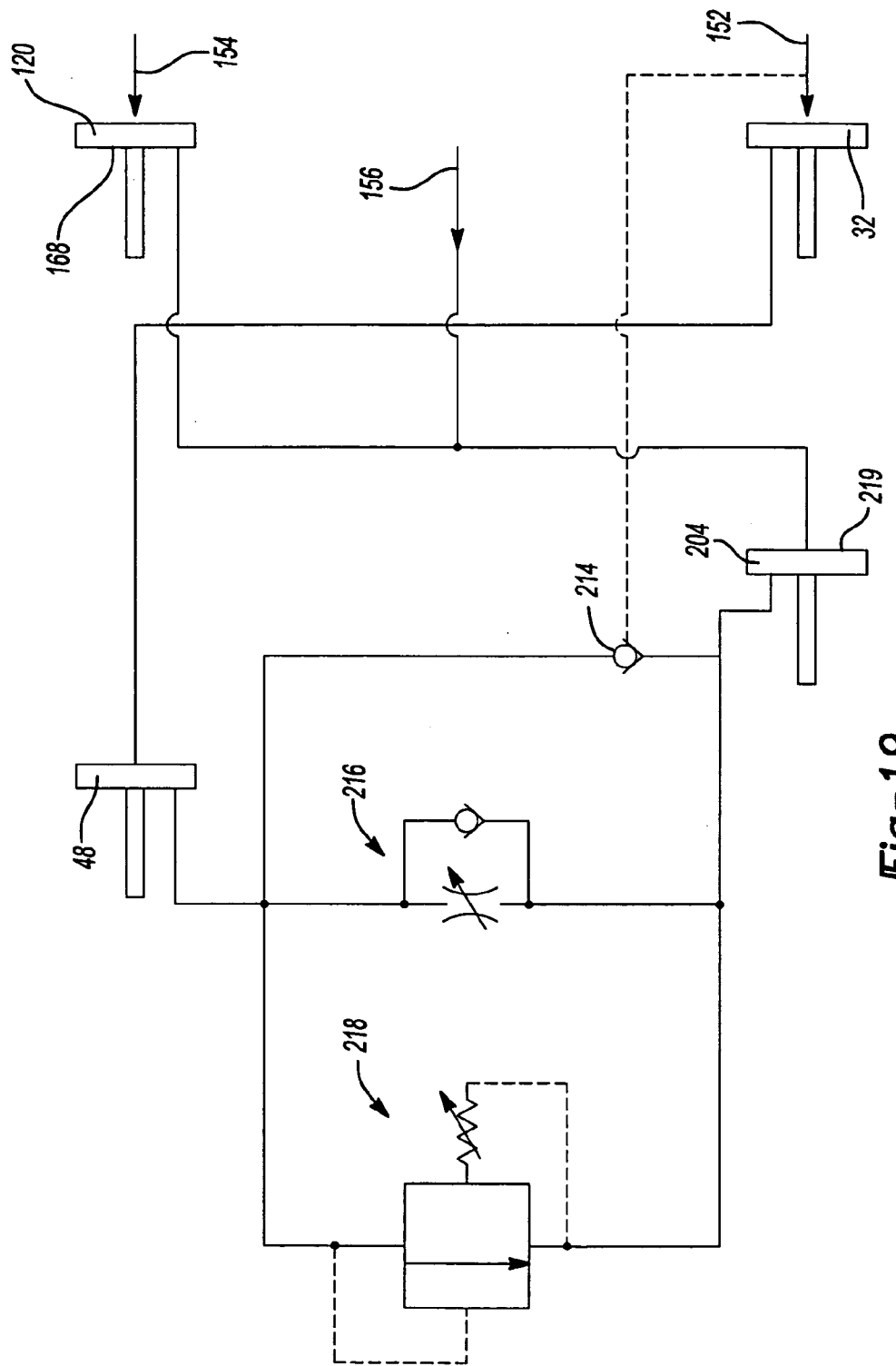
FIG. 19 is a pneumatic and hydraulic schematic depicting the components of the alternate embodiment pressure intensifier.

Dampening system 202 further includes a pilot operated check valve 214, a flow control valve 216 and a pressure relief valve 218. FIG. 19 is a pneumatic and hydraulic circuit schematic depicting how dampening system 202 interacts with ram 48, oil piston 32 and intensify piston 120. During the low pressure advance portion of operation of pressure intensifier 200, air pressure is supplied through first port 152 to oil piston 32 as well as pilot operated check valve 214. The pilot signal causes pilot operated check valve 214 to shift and allow a free flow of hydraulic fluid between ram 48 and dampening piston 204. During this portion of operation, pressurized air is supplied to first port 152 while second port 154 and third port 156 are opened to atmosphere.

Once ram 48 contacts the workpiece, pressure continues to build within third cavity 34. Once a predetermined pressure has been met, the pressure acting on oil piston 32 and pilot operated check valve 214 is released. The flow path through the pilot operated check valve 214 is now closed. Pressure is supplied to port 154 to intensify the force provided to the workpiece. Because the pilot operated check valve 214 is closed, fluid flow between ram 48 and dampening piston 204 must follow an alternate path that includes flow control valve 216. The rate of flow through flow control valve 216 is adjustable. The restricted fluid flow rate limits the rate of movement of the ram during the intensified portion of the stroke. The limitation of the rate of ram movement relative to housing 208 eliminates or reduces the shock generated at the end of processes such as stamping or piercing where the last portion of material rapidly breaks away. One skilled in the art will appreciate that the fluid located between ram 48 and dampening piston 204 is substantially incompressible. Compressible fluids such as air may not provide the dampening effect desired during this portion of the stroke.

Pressure relief valve 218 provides a further self-preserving feature within dampening system 202. Because flow control valve 216 may be adjusted to effectively close the flow path, back pressure generated within the system may potentially rise to a level that would damage the seals or other components in the cylinder assembly. In order to prevent system component damage, pressure relief valve 218 is configured to interconnect ram 48 and dampening piston 204 when an over pressure condition exists. Specifically, the pressure relief valve 218 is a normally closed valve that senses the pressure generated by ram 48. If the pressure exceeds a predetermined value, pressure relief valve 218 shifts to allow fluid to flow between ram 48 and the dampening piston 204 to relieve the high pressure. In the embodiment depicted in the figures, a target relief pressure of 3000 psi is set. Pressure relief valve 218 remains in the closed position until a predetermined relief pressure has been reached.

Once the working stroke has been completed, air is supplied to third port 156 while first port 152 and second port 154 are exhausted. Pressurized air acts on forward face 168 of intensify piston 120 and a rearward face 219 of dampening piston 204. As such, dampening piston 204 is driven to force hydraulic fluid to act on ram 48. In this manner, ram 48 and intensify piston 120 are moved to their retracted positions.

Pressure intensifier 200 also includes a face plate 220 for providing access to cavity 24. Face plate 220 is coupled to housing 208 with screws 222. Face plate 220 includes a slot 224 sized to receive key 38. Key 38 engages ram assembly 14 to prevent rotation of ram 48 relative to housing 208.

An optional proximity sensor 226 is coupled to housing 208. Housing 208 includes an aperture 228 to allow a head 230 of sensor 226 access to ram 48. Alternate locations for proximity sensor 226 may be chosen depending on packaging requirements for pressure intensifier 200. If optional proximity sensor 226 is not used, a plate 232 is attached to housing 208 to cover aperture 228.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. A pressure intensifier comprising:
   a housing:
   first and second pistons slidably positioned within said housing;
   a rod coupled to said second piston, said rod being driveable between an advanced position and a retracted position, said rod being operable to at least partially enter a body of substantially incompressible first fluid acting on said first piston;
   a valve selectively restricting flow of a second fluid acting on said first piston to limit the rate of movement of said first piston relative to said housing; and
   a pressure relief valve being operable to selectively allow said second fluid to freely pass therethrough thereby allowing said first piston to rapidly move when the pressure of said second fluid exceeds a predetermined value.

2. A method of operating a pressure intensifier having a one-piece housing as well as first and second pistons slidably moveable within the one-piece housing, the pressure intensifier further having a first fluid positioned on a first side of the first piston, a pilot-operated check valve, a second fluid positioned on the second side of the first piston and a rod coupled to the second piston, the method comprising:
   moving the second piston and the rod in an advancing direction to trap a portion of the second fluid in a cavity including the first piston;
   actuating the pilot-operated check valve to allow free flow of the first fluid during a portion of the moving the second piston step;
   advancing the rod to produce an intensified pressure on the first piston; and restricting flow of said first fluid within the one-piece housing to limit the rate of movement of the first piston.

3. The method of claim 2 wherein moving the second piston includes applying a pressurized fluid to the second piston.

4. The method of claim 3 further including storing incompressible fluid in a reservoir within the housing, a third piston contacting the stored incompressible fluid.

5. The method of claim 4 further including moving the third piston in an advancing direction to displace the incompressible fluid and drive the first piston in the advancing direction.

6. The method of claim 5 further including selectively driving a fourth piston slidably positioned within the housing in an advancing direction to move the first piston toward a retracted position.

7. The method of claim 6 further including substantially simultaneously supplying pressurized fluid to the second piston and the fourth piston to move the second and first pistons toward retracted positions.

8. A pressure intensifier comprising:
   a one-piece housing having a first end, an opposite second end, first and fourth bores having openings at said first end and third and second bores having openings at said second end, wherein said first and second bores extend substantially axially aligned with one another and said third and fourth bores extend substantially axially aligned with one another;
   first, second, third and fourth pistons slidably positioned in said first, second, third and fourth bore, respectively;
   a rod coupled to said second piston, said rod being drivable between an advanced position and a retracted position, said rod being engageable with a seal and operable to enter said first bore to produce an amplified force on said first piston; and
   a valve operable to selectively restrict a flow of fluid between said first piston and said fourth piston and limit the rate of travel of said first piston relative to said housing.

9. The pressure intensifier of claim 8 wherein said first and second bores axially extend substantially parallel to said fourth bore.

10. The pressure intensifier of claim 8 wherein said first piston extends outside of the housing.

11. The pressure intensifier of claim 8 wherein said valve is positioned within said housing between substantially parallel end walls of said third and fourth bores.

12. The pressure intensifier of claim 8 wherein said third bore contains a reservoir of fluid separately sealed from said first and second bores when said rod engages said seal.

13. A pressure intensifier comprising:
   a one-piece housing having a first end, an opposite second end, first and fourth bores having openings at said first end and third and second bores having openings at said second end;

first, second, third and fourth pistons slidably positioned in said first, second, third and fourth bore, respectively;

a rod coupled to said second piston, said rod being drivable between an advanced position and a retracted position, said rod being engageable with a seal and operable to enter said first bore to produce an amplified force on said first piston;

a valve operable to selectively restrict a flow of fluid between said first piston and said fourth piston and limit the rate of travel of said first piston relative to said housing; and a pilot operated check valve being plumbed in parallel with said valve.

14. The pressure intensifier of claim 13 wherein both of said valve and said pilot operated check valve are positioned within said housing.

15. A pressure intensifier for supplying force, the pressure intensifier comprising:

a housing having first, second, third and fourth blind bores, each blind bore terminating at a respective blind wall within the housing, the blind bores being in selective fluid communication with one another;

first, second, third and fourth pistons slidably positioned in the first, second, third and fourth blind bores, respectively;

a rod coupled to the second piston, said rod being drivable between and advanced position and a retracted position, the rod being engageable with a seal and operable to enter the first blind bore to produce an amplified force on the first piston; and a valve operable to selectively restrict a flow of fluid between the first piston and the fourth piston and limit the rate of travel of the first piston relative to the housing, wherein the valve is mounted within the housing at a location between the blind wall of the third blind bore and the blind wall of the fourth blind bore.

16. The pressure intensifier of claim 15 wherein the third blind bore and the fourth blind bore extend substantially axially aligned with one another.

17. The pressure intensifier of claim 16 wherein the first blind bore and the second blind bore extend substantially axially aligned with one another.

18. The pressure intensifier of claim 17 wherein the third blind bore contains a reservoir of fluid separately sealed from the first and second blind bores when the rod engages the seal.

* * * * *